United States Patent [19]
O'Connell

[11] 4,039,266
[45] Aug. 2, 1977

[54] COMBINATION STOP COLLAR AND CUTTING TOOL

[76] Inventor: John W. O'Connell, 18 Northgate Road, Carmel, N.Y. 10512

[21] Appl. No.: 706,230

[22] Filed: July 19, 1976

[51] Int. Cl.² .............................................. B23B 51/00
[52] U.S. Cl. .................................. 408/202; 408/241 S
[58] Field of Search ................... 408/241 S, 202, 226, 408/72 R

[56] References Cited
U.S. PATENT DOCUMENTS

| | | | |
|---|---|---|---|
| 832,444 | 10/1906 | Arnold | 408/202 |
| 2,353,514 | 7/1944 | Slater | 408/202 X |
| 3,620,637 | 11/1971 | Brown | 408/202 |

*Primary Examiner*—J. M. Meister

[57] ABSTRACT

A longitudinal cutting tool is formed with at least one groove and a stop collar is received on the cutting tool. The stop collar has a stop surface, and yieldably resilient means in the form of a threaded screw passing through a slot in the collar, and rubberized buttons inserted into the collar are used to adjust the collar on the cutting tool, and to operatively connect it thereto so as not to damage its groove; the cutting depth of the tool is limited when the stop face engages with the stop surface.

4 Claims, 4 Drawing Figures

COMBINATION STOP COLLAR AND CUTTING TOOL

BACKGROUND OF THE INVENTION

1. Field of the Invention

The field of the invention relates to a combination stop-collar and cutting tool.

2. Description of the Prior Art

There are a plurality of known depth gauges, countersinks, cutting stops or the like, the purpose of which is to drill an opening by a drilling toll only up to a preset depth. The above tools, however, are generally provided with metallic fastening means to attach a stop means to a rotary drill, thereby incurring the risk of damaging the rotary drill itself by the metallic fastening means.

SUMMARY OF THE INVENTION

It is accordingly an object of my present invention to provide a stop collar on a cutting tool which can be easily attached thereto without, however, damaging the cutting tool in the process of attachment.

I accordingly provide in combination with a longitudinal cutting tool formed with at least one groove, a stop collar received on the cutting tool; the stop collar has a stop surface, and yieldably resilient means for operatively connecting and longitudinally adjusting the stop collar on the cutting tool so as not to damage the groove thereof. The cutting depth of the tool is therefore limited by the stop face engaging with the stop surface of a work piece.

The collar has a longitudinal axis, and is formed with a longitudinal slot perpendicular to the axis, and the yieldably resilient means includes a threaded screw which may be passed through the longitudinal slot, and a lock nut which may be attached to the threaded screw; a compression spring surrounds the screw and is disposed within the slot, and a pair of washers are disposed at opposite ends of the spring. The collar is preferably formed with a plurality of openings radially spaced from the longitudinal slot, and the yieldably resilient means further include a plurality of rubberized buttons which may be inserted into the openings, respectively; the lock nut has preferably an inwardly facing rubberized end-portion. The stop collar is preferably made of synthetic plastic material, and the stop surface has an outermost portion slanting away from the work piece; the threaded screw is preferably formed with a knurled knob at one end thereof.

BRIEF DESCRIPTION OF THE DRAWING

My invention will be better understood with reference to the accompanying drawing, in which.

DESCRIPTION OF THE PREFERRED EMBODIMENT

Figure 1:
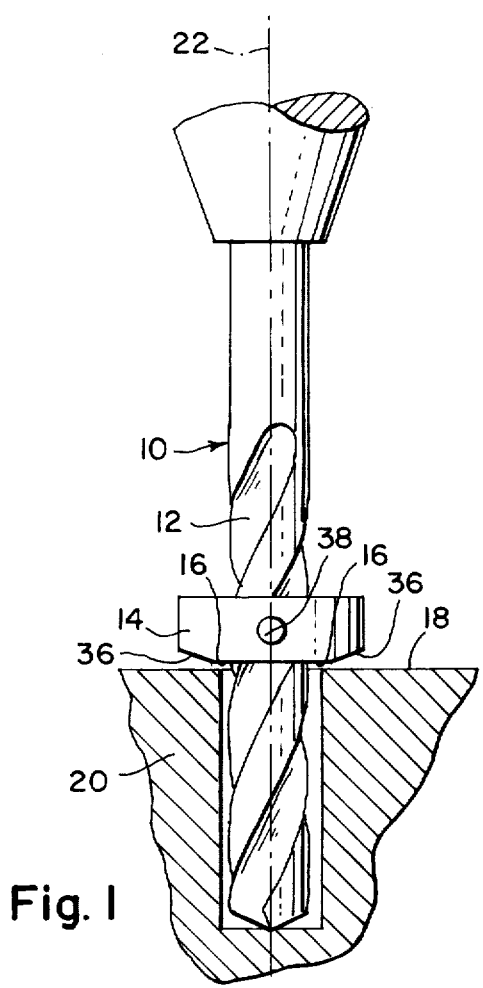
FIG. 1 is an elevational view of the combination according to my invention.
Figure 2:
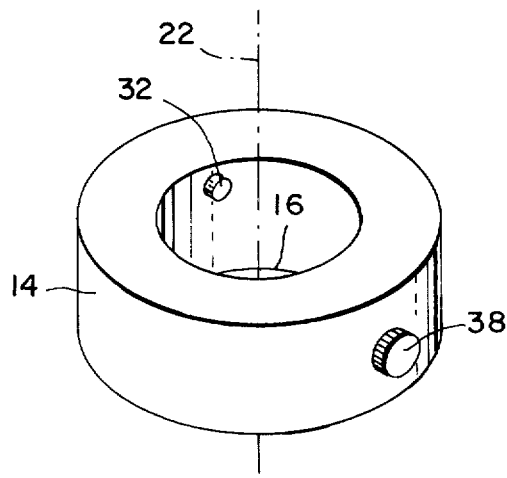
FIG. 2 is a perspective view of the collar of the invention.
Figure 3:
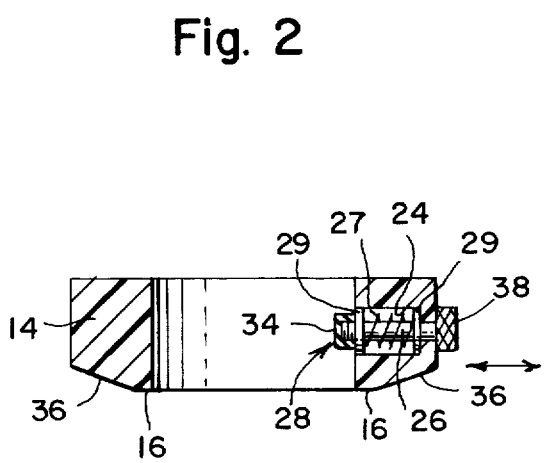
FIG. 3 is an elevational view of the collar in partial cross-section.
Figure 4:
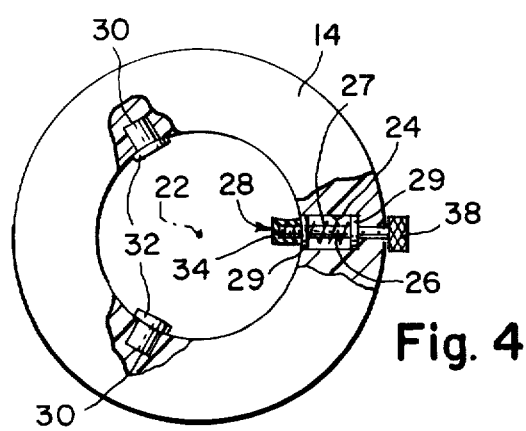
FIG. 4 is a plan view of the collar in partial cross-section.

Referring now to the drawing, a longitudinal cutting tool 10 will be seen to be formed with at least one groove 12, and a stop collar 14 is received on the cutting tool 10. The stop collar 14 has a stop surface 16, and yieldably resilient means for operatively connecting and longitudinally adjusting the stop collar 14 on the cutting tool 10, so as not to damage the groove 12 thereof; the cutting depth of the tool 10 is limited upon the stop face 16 engaging with a stop surface 18 of a work piece 20. The collar 14 has a longitudinal axis 22, and is formed with a longitudinal slot 24 perpendicular to the axis. The yieldably resilient means comprises a threaded screw 26, which may be passed through the longitudinal slot 24, a lock nut 28 attachable to the threaded screw 26, a compression spring 27 surrounding the screw 26 and disposed within the slot 24, and a pair of washers 29 preferably disposed at opposite ends of the spring 27. The collar 14 is preferably formed with a plurality of openings 30 radially spaced from the longitudinal slot 24; the yieldably resilient means further include a plurality of rubberized buttons 32, which may be inserted into the openings 30, as can perhaps best be seen in FIG. 4. The lock nut 28 has preferably an inwardly facing rubberized end-portion 34. The stop collar 14 is preferably made of synthetic plastic material, and the stop surface 16 has an outermost portion 36 slanting away from the work piece 20; this prevents damage to both the stop collar and the work piece, if the work piece is accidentally not aligned completely at right angles with the worktool. The threaded screw 26 is preferably formed with a knurled knob 38 at one end thereof to permit easy application or attachment of the collar to the rotary tool.

Although the invention has been described with respect to a preferred version thereof, it is to be understood that it is not to be so limited since changes can be made therein which are within the full intended scope of the appended claims.

What is claimed is:

1. In a combination with a longitudinal cutting tool formed with at least one groove, a stop collar received on said cutting tool, said stop collar having a stop surface, and yieldably resilient means for operatively connecting, and longitudinally adjusting said stop collar on said cutting tool so as not to damage the groove thereof, said collar having a longitudinal axis and being formed with a longitudinal slot perpendicular to said axis, and wherein said yieldably resilient means comprise:
   a threaded screw passable through said longitudinal slot;
   a lock nut attachable to said threaded screw;
   a compression spring surrounding said screw and disposed within said slot; and
   a pair of washers disposed at opposite ends of said spring, whereby the cutting depth of said tool is limited upon said stop face engaging with a stop surface of a work piece.

2. The combination according to claim 1 wherein said collar is formed with a plurality of openings radially spaced from said longitudinal slot and wherein said yieldably resilient means further comprises a plurality of rubberized buttons insertable into said openings, respectively.

3. The combination according to claim 1 wherein said lock nut has an inwardly facing rubberized end-portion.

4. The combination according to claim 1 wherein said stop collar is synthetic plastic material, wherein said stop surface has an outermost portion slanting away from the work piece, and wherein said threaded screw is formed with a knurled knob at one end thereof.

* * * * *